(12) United States Patent
Takita et al.

(10) Patent No.: US 6,469,891 B1
(45) Date of Patent: Oct. 22, 2002

(54) INFORMATION PROCESSOR

(75) Inventors: Isao Takita, Yokohama (JP); Naoko Iwami, Sagamihara (JP); Yoshiaki Eguchi, Machida (JP); Shin'ichi Sawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,503

(22) Filed: Mar. 1, 2000

(30) Foreign Application Priority Data

Mar. 1, 1999 (JP) ............................................ 11-052253

(51) Int. Cl.⁷ ................................................ H05K 5/00
(52) U.S. Cl. ........................ 361/686; 361/683; 361/684; 361/724; 379/429; 379/434; 455/73; 455/84; 455/89; 429/96; 429/100; 312/223.1; 312/223.2
(58) Field of Search ................................. 361/683–686, 361/724–727, 754, 759, 814; 379/429, 434; 455/73, 84, 89, 45, 348, 346; 429/96, 97, 99, 100; 312/223.1, 223.2

(56) References Cited

U.S. PATENT DOCUMENTS

| 5,463,687 A | * | 10/1995 | Takizawa ..................... 379/433 |
| 5,526,411 A | * | 6/1996 | Krieter ........................ 379/110 |
| 5,845,217 A | * | 12/1998 | Lindell et al. .............. 455/557 |
| 5,907,615 A | * | 5/1999 | Kaschke ..................... 379/433 |
| 5,999,821 A | * | 12/1999 | Kaschke ..................... 455/550 |
| 6,029,072 A | * | 2/2000 | Barber ........................ 455/557 |

* cited by examiner

Primary Examiner—Darren Schuberg
Assistant Examiner—David Foster
(74) Attorney, Agent, or Firm—Antonelli, Terry, Stout, & Kraus, LLP.

(57) ABSTRACT

An information processing apparatus which provides a part of an additional interface in the power module and makes connection to an external device through the power module. The body of the apparatus is made to be lightweight and miniaturized. If installation of another interface is necessary, this can be realized by changing the power module.

9 Claims, 9 Drawing Sheets front view back view front view back view front view front view front view side view back view

INFORMATION PROCESSOR

BACKGROUND OF THE INVENTION

The present invention relates to a method of connecting an external device to an information terminal apparatus that has an electronic power supply in the form of a battery which can be attached to and removed from the body of the information terminal apparatus.

So far, as shown in "Latest personal computer technique system '95", the NIKKEI BYTE, page 13–19, an information processor is connected to an external device through a system bus and a variety of I/F controllers from the CPU of the body. In the desk top type of information processor, a connection of an external device by way of various interfaces was dealt with by adding an interface substrate on the system bus. On the other hand, in case of a notebook PC, etc., a controller and a connector for various interfaces were installed in the body in advance, and the connector and a peripheral device were connected to each other.

If it became necessary to add an interface to a notebook PC, in the prior art, it was necessary to replace the body. And, for a user not using the connector already attached to the body of the equipment, the space occupied by that connector was essentially wasted space, and so a large scale of the body equipment was induced, and significant labor was necessary at the time of movement of the equipment. In addition, for small information device that is used at another destination, further installation of an interface was impossible.

SUMMARY OF THE INVENTION

In the information processor of the present invention, by holding part of an additional interface in the power module and making a connection to an external device through the power module, the equipment body can be lightweight and miniaturized. And, if installation of another interface is necessary, the further installation can be realized merely by changing the power module.

DESCRIPTION OF PREFERRED EMBODIMENT

Figure 1:
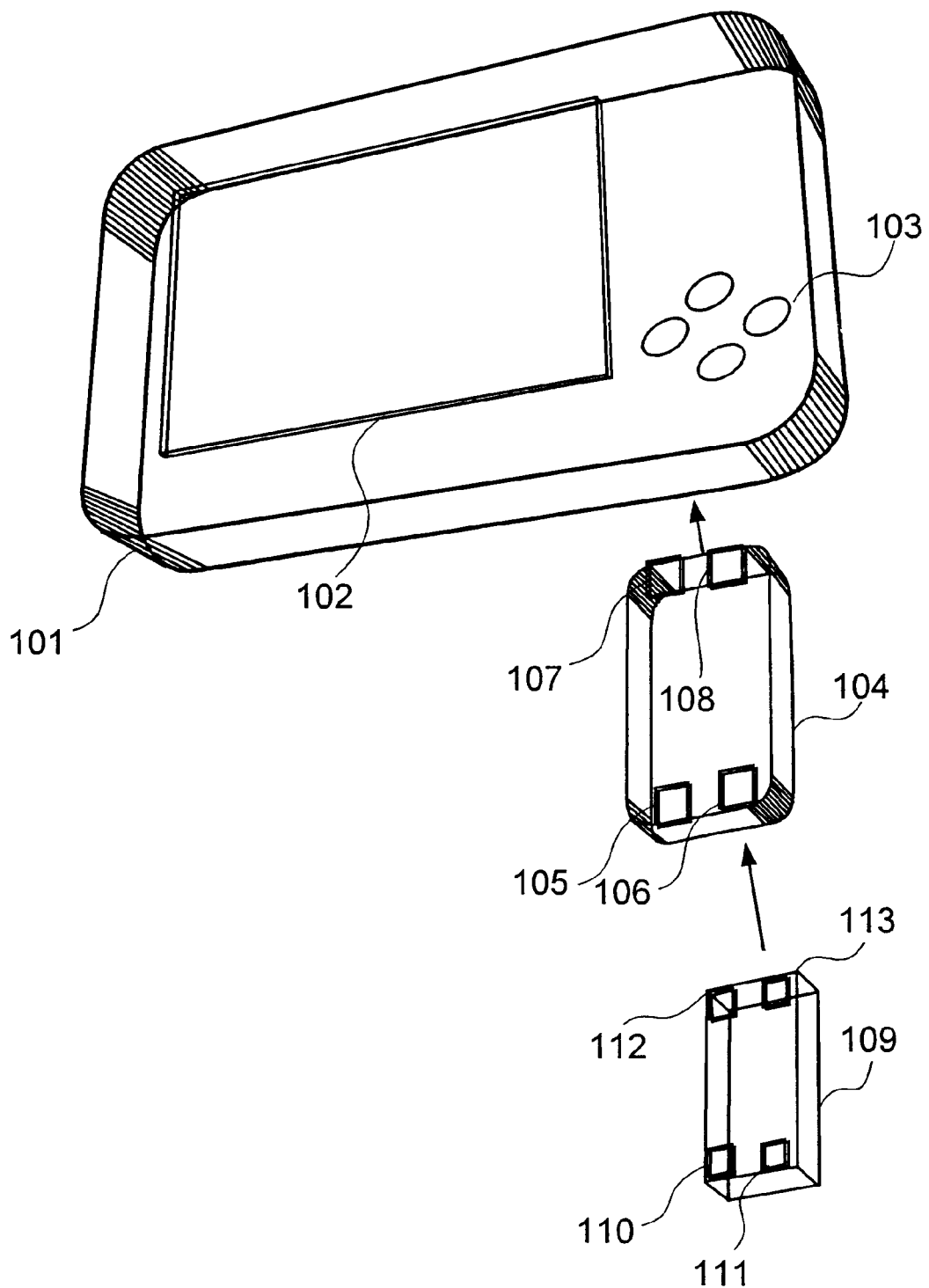
FIG. 1 is an exploded perspective view of an information processor.
Figure 2:
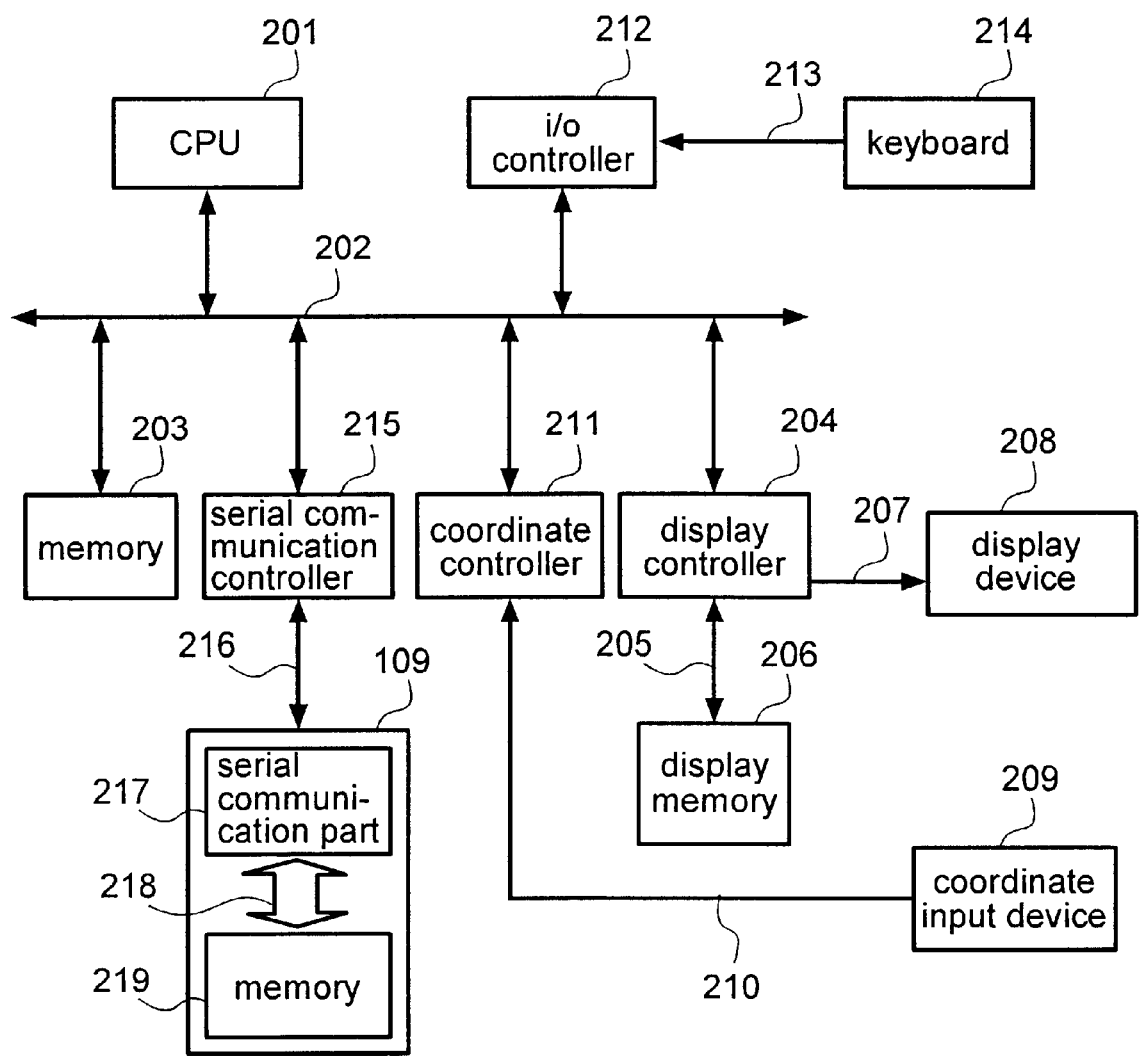
FIG. 2 is a block diagram of an information processor representing a first embodiment.

The first embodiment of the present invention, which performs serial communication between an external device and an information processor, will be explained with reference to FIG. 1 and FIG. 2. FIG. 1 is an exploded perspective view of the information processor, and FIG. 2 is a block diagram of the information processor.

The information processor body 101 has a display part 102, a key input part 103, a power module 104 installed in the body 101 and having power pins 105, 106 and interface pins 107, 108 for serial communication, and an external device 109 having power pins 110, 111 and interface pins 112, 113 for serial communication.

CPU 201 executes various operations, I/O controller 212 connects keyboard 214 through output bus 213, memory 203 stores data and programs, serial communication controller 215 controls serial communication, coordinate controller 211 calculates coordinates on the basis of data inputted from coordinate input device 209 connected through display data bus 210, and display controller 204 connects display memory 206, which stores display data, through display memory bus 205 and connects display device 208 through display data bus 207. These devices are connected to each other through system bus 202 and to the CPU and each of the controllers for controlling an interface to an external device. Serial communication controller 215 is connected to serial communication part 217 of external device 109 through serial communication line 216, and serial communication part 217 is connected to memory 219 through memory bus 218.

Serial communication controller 215 and serial communication part 217 convert data on the system bus 202 and memory bus 218, which are parallel buses, into serial data, and execute communication through serial communication line 216.

An operation of the external device 109 and the information processor 101 will be explained in detail. As shown in FIG. 1, power module 104 is connected to information processor 101 and electronic power is supplied therefrom to the information processor 101. On the other hand, power module 104 is connected to serial communication line 216, which is an input/output line of the serial communication controller 215 of information processor 101, as shown in FIG. 2, through interface pins 107, 108 for serial communication. On the other hand, electronic power is supplied to external device 109 in FIG. 1 from power module 104 through power pins 110, 111, and serial communication to power module 104 is possible through serial communication pins 112, 113. In power module 104, signal lines that connect serial communication line 216 of information processor 101 to serial communication pins 112, 113 of the external device 109 are provided. Therefore, as shown in FIG. 2, serial communication line 216 can be connected to external device 109.

The access from CPU 201 to memory 219 of external device 109 is executed by accessing the serial communication controller 215 through system bus 202. Serial communication controller 215 accesses the serial communication part 217 of external device 109 through serial communication line 216. Serial communication part 217 accesses the memory 219 through memory bus 218, on the basis of an access request sent through serial communication line 216.

If the access is a read request, CPU 201 sends a data reading request and an address thereof to serial communication controller 215 through system bus 202. Serial communication controller 215 transmits the read request and the address to serial communication part 217 of external device 109 through serial communication line 216. Serial communication part 217 generates a request for reading an address and sends it to memory 219 through memory bus 218 on the basis of the received read request and address. The read data generated from memory 219 is sent to serial communication controller 215 through serial communication line 216 from serial communication part 217. Serial communication controller 215 forwards the sent data to CPU 201 through system bus 202.

If the access is a write request, CPU 201 sends a data write request, a write address and data to serial communication controller 215 through system bus 202. Serial communication controller 215 transmits the write request, address and data to serial communication part 217 of external device 109 through serial communication line 216. Serial communication part 217 generates a write request and sends the instructed address and data to memory 219 through memory bus 218 on the basis of the received write request and address.

By the aforementioned processing, the communication between the information processor body 101 and external device 109 can be executed through power module 104.

If access to the external device 109 is unnecessary, by using a power module 104 having only power pins 105, 106 in the information processor body 101, the equipment can be connected with a power module having a power capacity which is larger only in the space shared by the interface, and the operation time of the information processor 101 can be lengthened.

In the present embodiment, a case of reading data from and writing data to a memory is treated, but the present invention is not limited to access to the memory, and the present invention can be applied to any other external device in which data is sent and received on the basis of an address.

Figure 3:
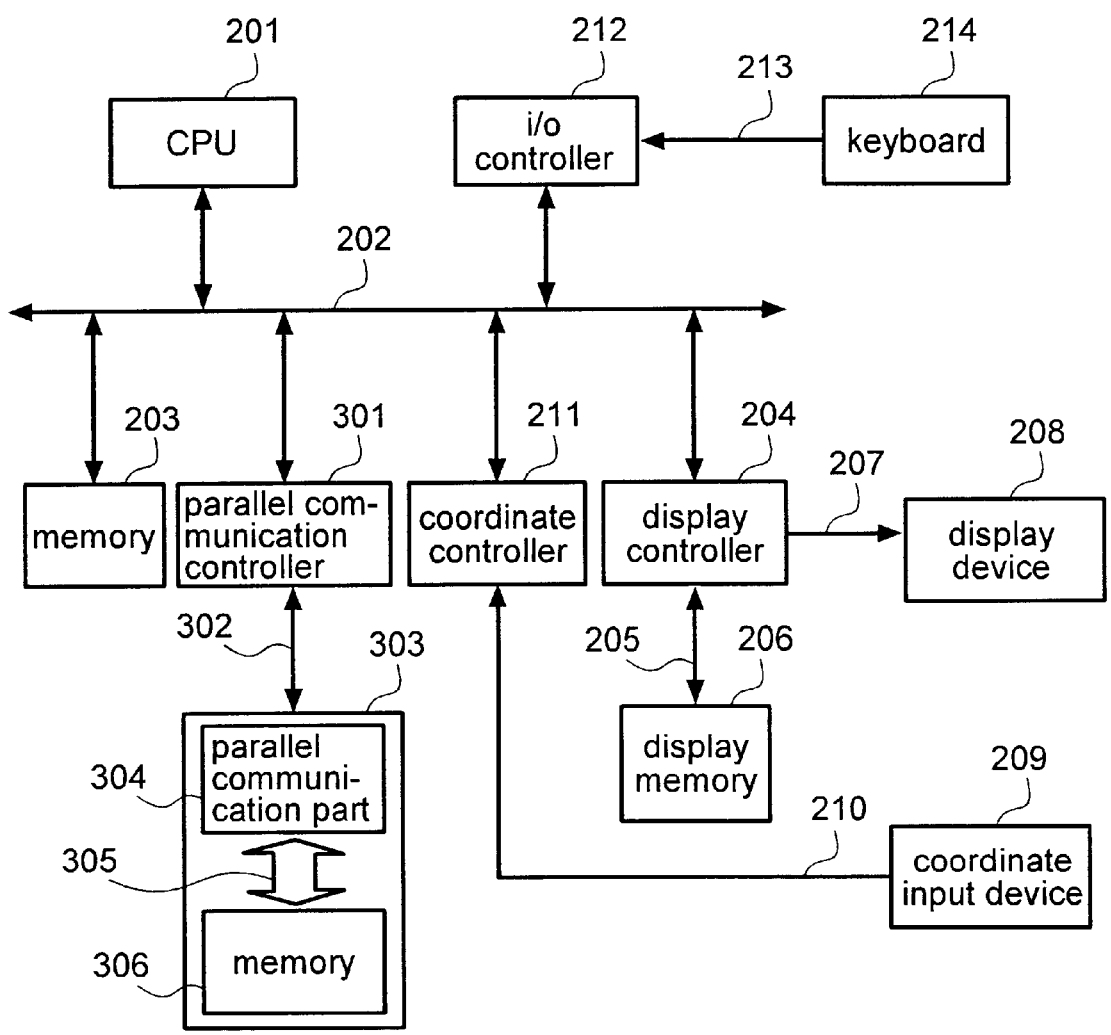
FIG. 3 is a block diagram of an information processor representing a second embodiment.

The second embodiment of the present invention, which performs parallel communication between an external device and an information processor will be explained with reference to FIG. 3, which is a block diagram of the information processor.

This embodiment is similar to FIG. 2, except for provision of parallel communication controller 301, parallel communication line 302, external device 303 having a parallel communication interface, parallel communication part 304, memory bus 305, and memory 306.

Parallel communication controller 301 and parallel communication control part 304 convert data on system bus 202 and memory bus 305, which operates on the basis of different protocols, through a parallel bus connected to each of the parts, into a protocol for parallel communication, and execute communication through parallel communication line 302.

The method of accessing the external device 303 will be explained similar to that of the first embodiment, and an explanation of those features of the operation that are similar to the first embodiment will be omitted.

If there is a read request from CPU 201, the read request and a read address are sent from CPU 201 to parallel communication controller 301. Parallel communication controller 301 transmits the read request and read address to the parallel communication part 304 of the external device 303 through parallel communication line 302. Therefore, parallel communication part 304 transmits the read request and read address to memory 306. Memory 306 transfers the data stored at the request address to parallel communication part 304 through memory bus 305. The data that parallel communication part 304 reads is transferred to parallel communication controller 301 through parallel communication line 302 and is then sent to CPU 201.

If there is a write request from CPq 201, parallel communication controller 301 transmits a write request, a write address and write data to parallel communication part 304 through parallel communication line 302. Parallel communication part 304 receives the write request, and transfers the a write request, write address and write data to memory bus 305 and writes the data into memory 306.

In the present embodiment, a case of reading data from and writing data to a memory is treated, but the present invention is not limited to access to a memory, and the present invention can be applied to any other external device in which data is sent and received on the basis of an address.

Figure 4:
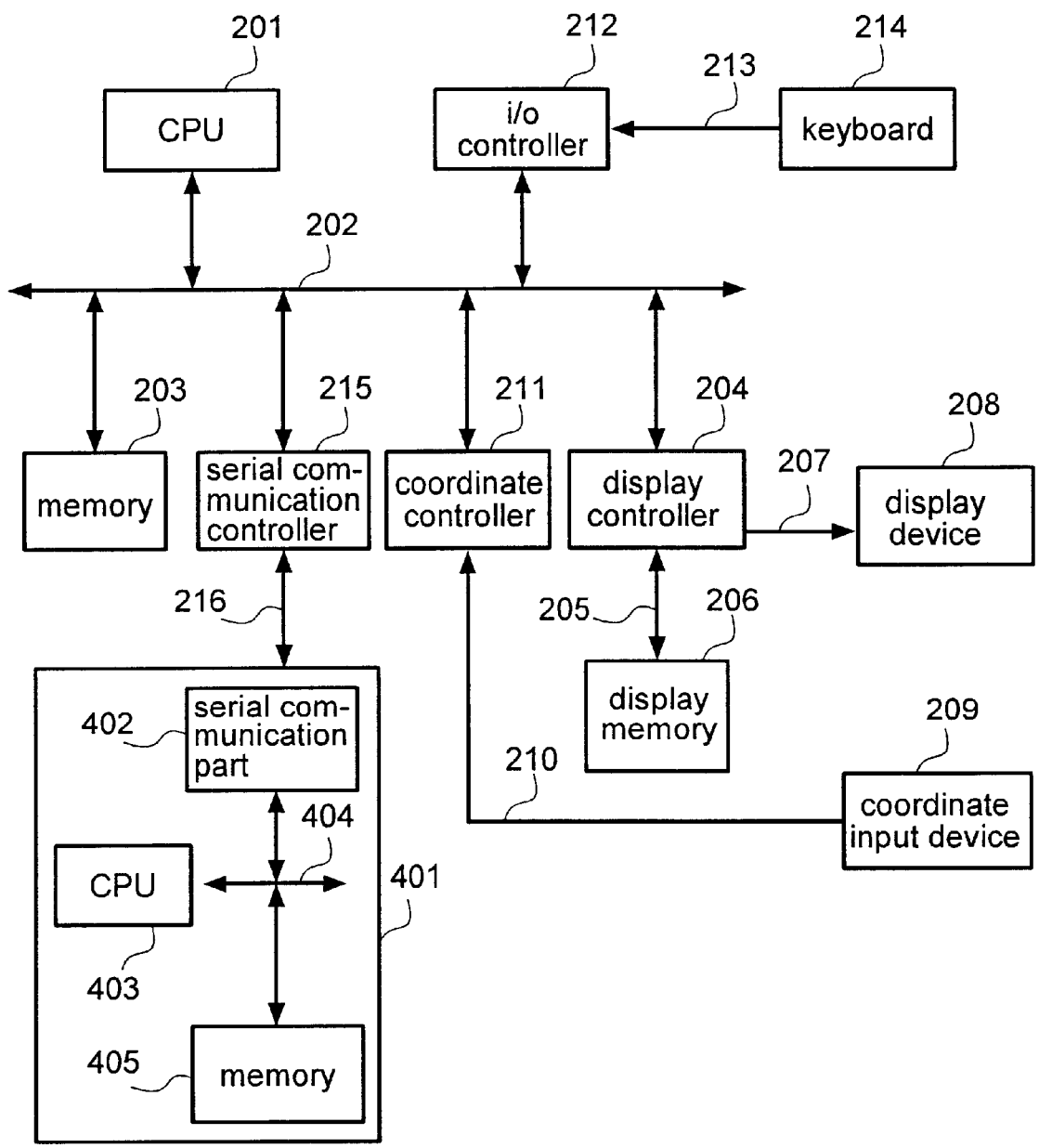
FIG. 4 is a block diagram of an information processor representing a third embodiment.

The third embodiment of the present invention, that protects data stored in the external device by using a CPU provided in the external device, will be explained with reference to FIG. 4, which is a block diagram of an information processor.

This embodiment is similar to FIG. 2, except for provision of power module 401, serial communication part 402, CPU 403 in power module 401, system bus 404 in power module 401, and memory 405. Since the basis system operations are similar to those of the first embodiment, an explanation thereof will be omitted.

If memory 405 in power module 401 is accessed from CPU 201, serial communication part 402 requests a bus privilege of the system bus 404 for CPU 403 and accesses the memory 405 after acquiring the bus privilege. The operations other than acquisition of a bus privilege are similar to those of the first embodiment. The control process in a case where CPU 403 is installed in the external device 401 will be explained.

If CPU 403 executes access management to protect the data of memory 405 at the time of an access to the data to memory 405, CPU 403 requests key information, such as a password, from the information processor in the case where the access is from the information processor after connecting the external device 401. In response to the request, CPU 201 generates the password data of the external device 401 stored in memory 203 in advance to external device 401 through system bus 202, serial communication controller 215 and serial communication line 216. The input data is received by serial communication part 402 and is sent to CPU 403. CPU 403 compares the sent data with password data stored in memory 405, and if the passwords are coincident, the access to external device 401 is permitted, and if the passwords are different, all access is denied.

Therefore, the data of external device 401 can be protected by using CPU 403. The method for using CPU 403 should not be limited to the method employed in the above embodiment and can be easily implemented by preparing in memory a program that executes a process, etc. of data in memory 405.

Figure 5:
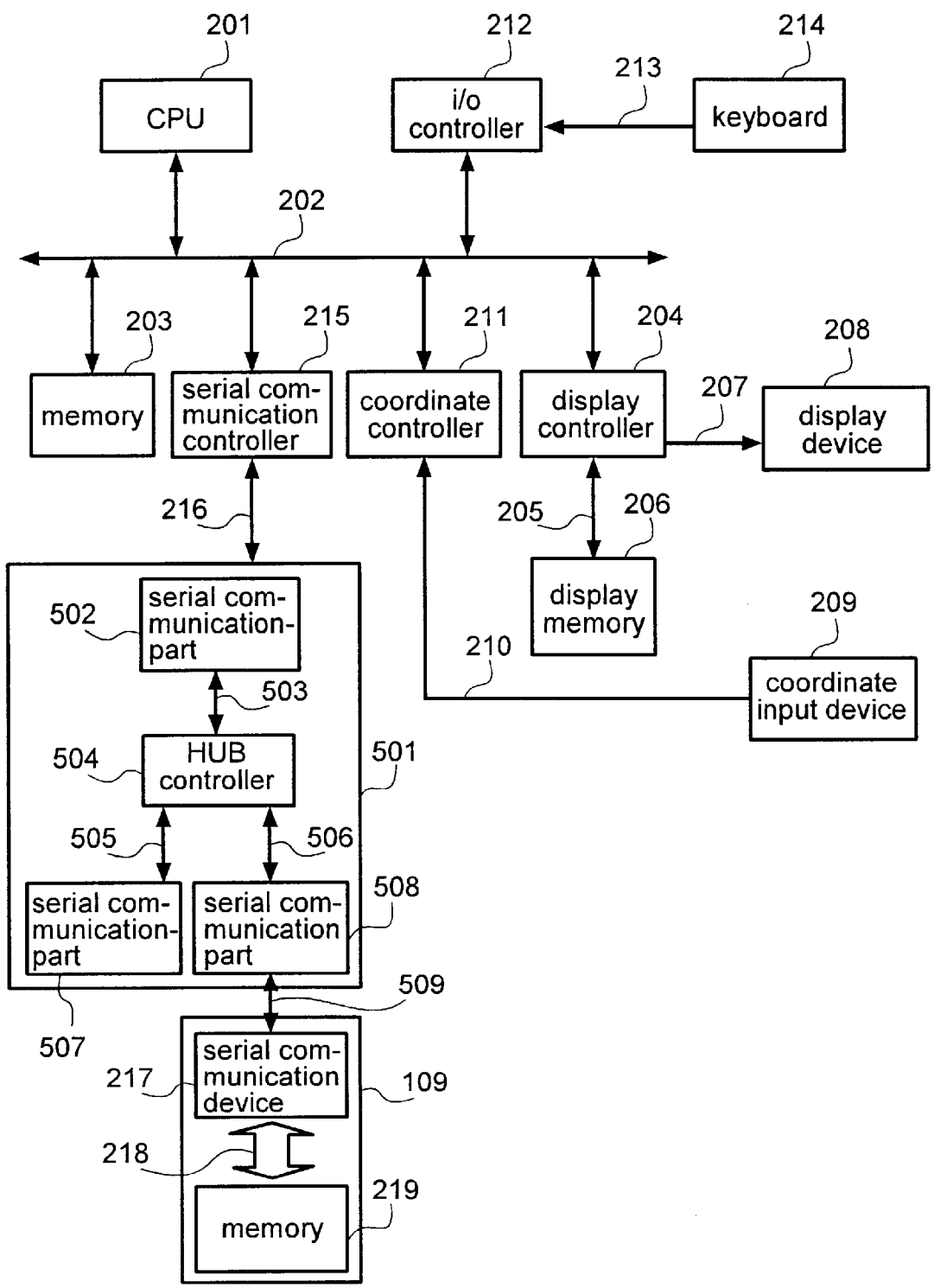
FIG. 5 is a block diagram of an information processor representing a fourth embodiment.

The fourth embodiment, in which several external devices execute serial communication with an information processor will be explained with reference to FIG. 5, which is a block diagram of the information processor.

This embodiment is similar to FIG. 2, except for provision of power module 501, serial communication part 502 of the power module 501, output bus 503 of the serial communication part 502, HUB controller 504, output buses 505 and 506 of HUB controller 504, serial communication parts 507 and 508, and serial communication line 509 deriving from power module 501.

The HUB controller 504 of the present embodiment controls the communication condition of serial communication parts 507, 508 through output buses 505, 506. By using the structure shown in FIG. 5, external devices can be recognized hierarchically from CPU 201. That is, the HUB controller 504 can be detected under the information processor body, and external devices can be recognized to the lower part through two serial communication parts.

CPU 201 inquires first about the number of output buses connected to the HUB controller 504 through serial communication part 502. The designation "2" is returned from the HUB controller 504 in case of the present embodiment. Numbers are assigned to each output bus at the time and are returned to the CPU 201. For example, the first number is assigned to the output bus 505 and the second number is assigned to the output bus 506. Next, CPU 201 executes access to external device 217 through serial communication part 508.

As an example, the HUB controller 504 is notified that output bus 506, that is, the second bus is used in this case. The HUB controller 504 sets output buses 503, 506 to a connection condition by this request. Next, an access request is generated to external device 109. Then, as output buses 503, 506 have been set in a connection condition by the HUB controller 504, an access request is transmitted to external device 109 through serial communication part 508 and serial communication line 509.

As stated above, by attaching the HUB controller 504 to power module 501, a plurality of communication lines can be connected to an information processor body, and a plurality of devices can be connected to a power module 501.

Figure 6A:
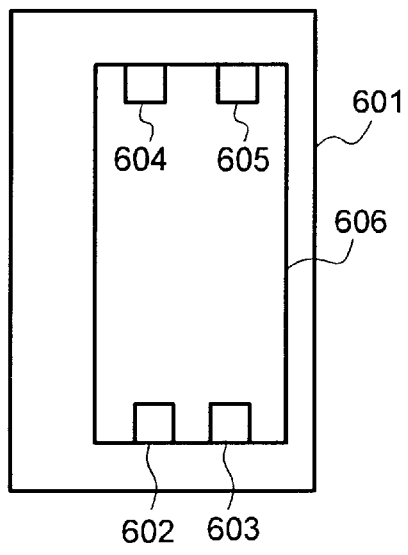
FIG. 6a is a front view of the power module in the first and the third embodiment.
Figure 6B:
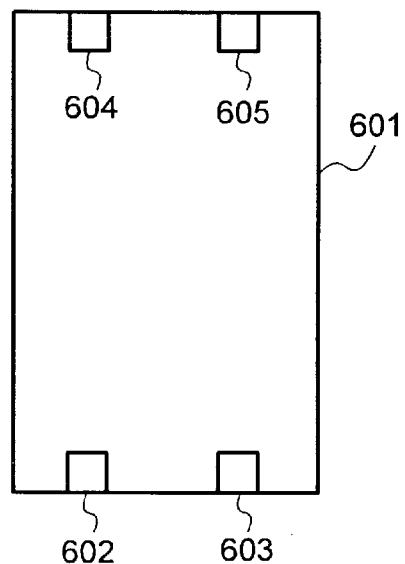
FIG. 6b is a back view of the power module in the first and the third embodiment.

The outside of the power module of the first and third embodiments is shown in FIGS. 6a and 6b. FIG. 6a is the front view of a power module, and FIG. 6b is a back view. The power module 601 is connected to an external device installed in area 606 through power pins 602, 603 for the external device and interface pins 604, 605 for serial communication.

Figure 7A:
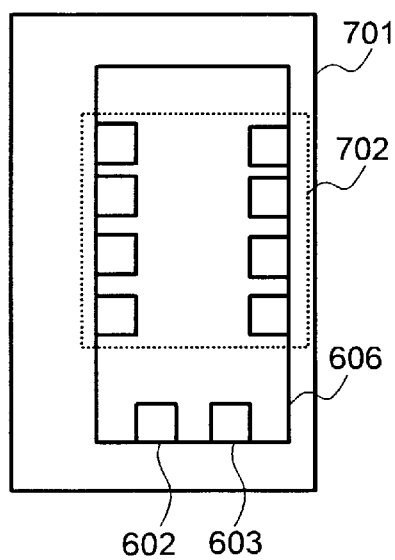
FIG. 7a is a front view of the power module in the second embodiment.
Figure 7B:
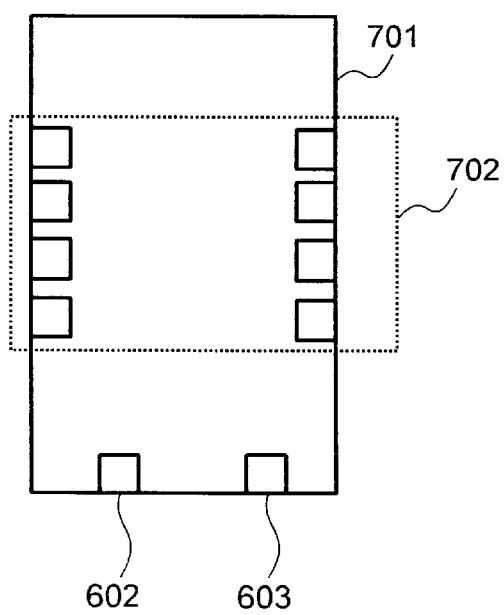
FIG. 7b is a back view of the power module in the second embodiment.

The outside of the power module of the second embodiment is shown in FIGS. 7a and 7b. FIG. 7a is the front view of a power module, and FIG. 7b is a back view. The power module 701 executes parallel communication with the external device installed in area 606 through interface pin 702 for parallel communication.

Figure 8A:
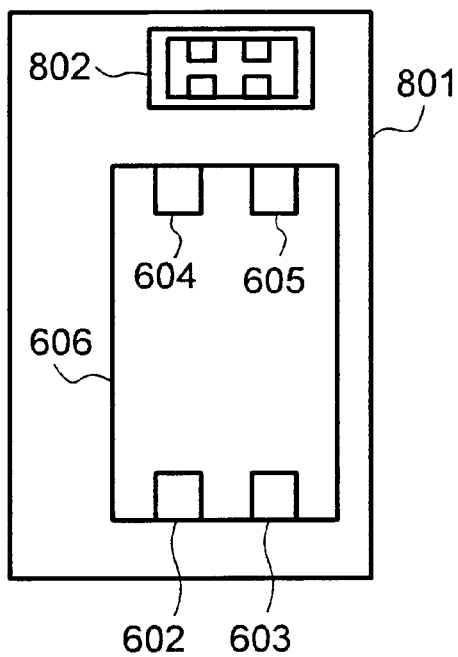
FIG. 8a is a front view of the power module in the fourth embodiment.
Figure 8B:
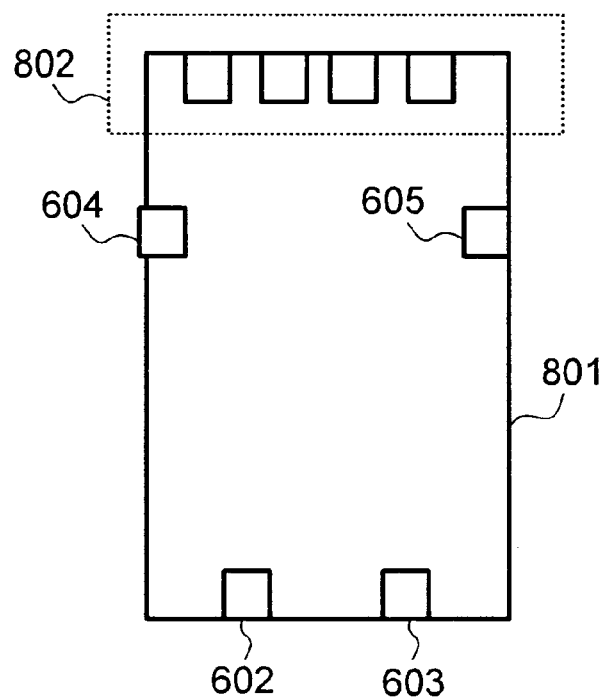
FIG. 8b is a front view of the power module in the fourth embodiment.

The outside of the power module of the fourth embodiment is shown in FIGS. 8a and 8b. FIG. 8a is the front view of a power module, and FIG. 8b is a front view of a modified form. The power module 801 executes serial communication with the second external device through the second interface pin 802 for serial communication. While an interface pin for serial communication is shown in FIGS. 8a and 8b, the same effect also is obtained with a parallel communication interface. And, the installed interface pin for communication is not limited to a case of serial communication or parallel communication.

Figure 9A:
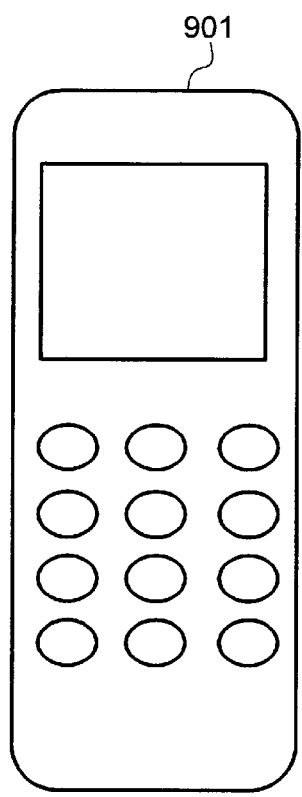
FIG. 9a is a front view of a handy phone.
Figure 9B:
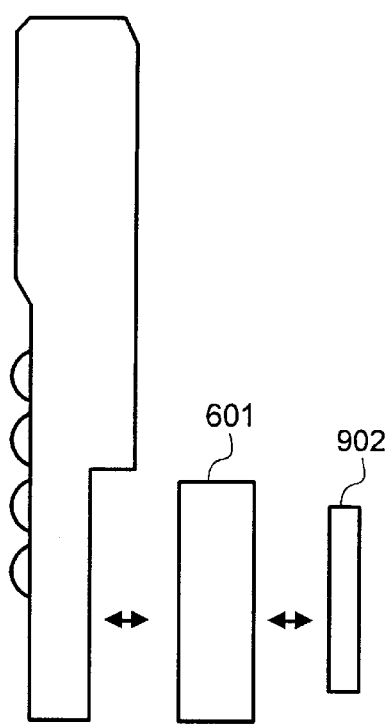
FIG. 9b is a side view of the handy phone.
Figure 9C:
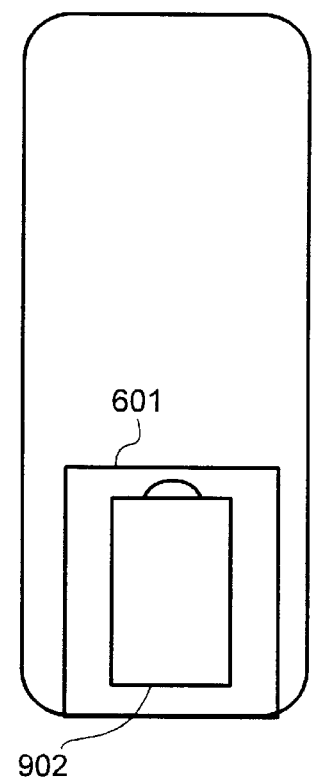
FIG. 9c is a back view of the handy phone.

The outside of the connection to a handy phone is shown in FIGS. 9a, 9b and 9c. FIG. 9a is a front view of the handy phone, FIG. 9b is a side view, and FIG. 9c is a back view.

The handy phone 901 has a memory 902 having a serial communication function. Memory 902 having a serial communication function is connected to the power module 601 having a serial communication, such as seen in FIGS. 6a and 6b, and is used as a power module of the handy phone 901. As shown in the first embodiment, this handy phone 901 has a serial pin at the connection part of the power module. Therefore, data obtained from communication by the handy phone 901 and data of the internal memory can be kept in memory 902. On the other hand, data in memory 902 can be transmitted to handy phone 901. In addition, through memory 902, for example, data can be shared with the information processor 101 shown in the first embodiment.

Figure 10A:
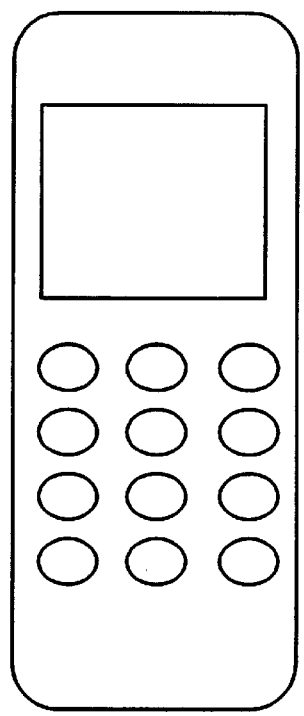
FIG. 10a is a front view of the handy phone.
Figure 10B:
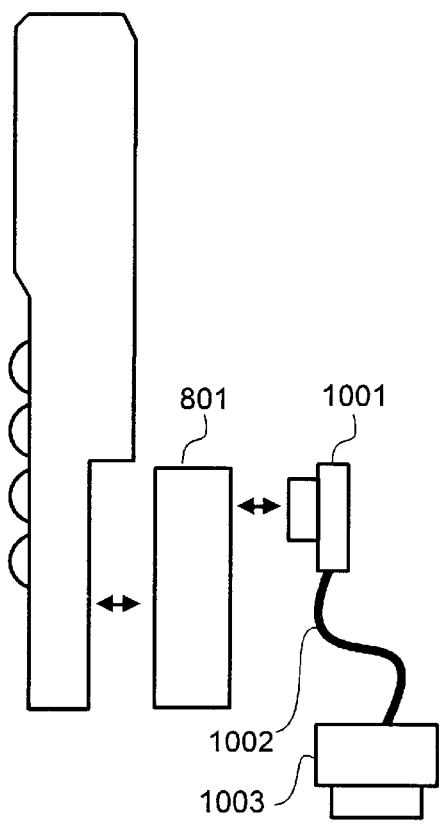
FIG. 10b is a side view of the handy phone.
Figure 10C:
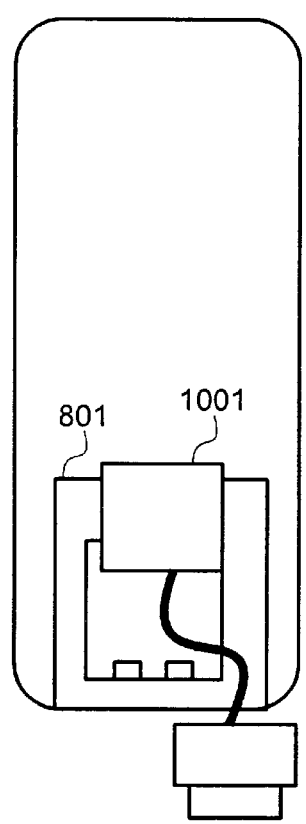
FIG. 10c is a back view of the handy phone.

The outside of the connection to the handy phone having another interface is shown in FIGS. 10a, 10b and 10c. Connector 1001 connected to interface 802 for serial communication of power module 801 is connected to connector 1003 for serial communication of another device by cable 1002. Handy phone 1004 has two serial interfaces like the third embodiment. For example, connector 1003 is a connector for serial communication of the PC, and connector 1001 is a private use connector for power module 801. As for connectors 1001 and 1003, the same connector shape is available.

By connecting power module 801 and connector 1001 to handy phone 1004, data that handy phone 1004 has obtained in communication with the outside and internal data can be transmitted to a device, such as the PC, through connector 1001, cable 1002 and connector 1003. And, the data from the PC can be transmitted to an external device and the inside of the handy phone. In addition, by transmitting with serial communication, the command that controls the PC and the handy phone 1004 mutually, executing mutually remote operations of the device is enabled. Similarly, by using a parallel interface, for example, data held in the handy phone can be generated from a printer.

In accordance with the present invention, by connecting an external device to the processor body through a power module, a user of an external interface can use the function of an external device by merely changing the power module. And, a user not using an external interface uses a system having minimum structure, so that a reduction in the weight and miniaturization of the information processor are achieved.

What is claimed is:

1. An information processor having a body including a CPU for executing a program, a memory for storing said program and data, a display part for displaying a result of execution of said program, an I/O part for controlling a key input, and a power module for providing electrical power to said body and being removable from said body, said body comprising:
at least one interface pin and at least one power pin provided in a connection part of said body for connecting to said power module;

said power module comprising:
at least one interface pin and at least one power pin provided in a connection part of said power module for connecting to said body, and
at least one interface pin and at least one power pin provided in a connection part of said power module for connecting to an external device,
wherein said interface executes serial communication.

2. An information processor having a body including a CPU for executing a program, a memory for storing said program and data, a display part for displaying a result of execution of said program, an I/O part for controlling a key input, and a power module for providing electrical power to said body and being removable from said body, said body comprising:
    at least one interface pin and at least one power pin provided in a connection part of said body for connecting to said power module;

said power module comprising:
    at least one interface pin and at least one power pin provided in a connection part of said power module for connecting to said body, and
    at least one interface pin and at least one power pin provided in a connection part of said power module for connecting to an external device,
    wherein said interface executes parallel communication.

3. An information processor having a body including a CPU for executing a program, a memory for storing said program and data, a display part for displaying a result of execution of said program, an I/O part for controlling a key input, and a power module for providing electrical power to said body and being removable from said body, said body comprising:
    at least one interface pin and at least one power pin provided in a connection part of said body for connecting to said power module;

said power module comprising:
    at least one interface pin and at least one power pin provided in a connection part of said power module for connecting to said body,
    at least one interface pin and at least one power pin provided in a connection part of said power module for connecting to an external device, and
    HUB means disposed in said power module for connecting a plurality of communication lines to communication lines in said body.

4. An information processor according to claim 3, said power module further comprises at least two connection parts of external interface.

5. An information processing apparatus comprising:
a body for processing information; and
a power module for providing electrical power to said body and being removable from said body,
wherein said body comprises:
    a first connecting means for connecting to said power module;

wherein said power module comprises:
    a second connecting means for connecting to said body, and
    a third connecting means for connecting to an external device, and
    wherein said body is capable of accessing said external device through said power module.

6. An information processing apparatus comprising:
a body including a central processing unit (CPU) for executing a program, a memory for storing said program and data, a display part for displaying execution result of said program, an input/output (I/O) part for controlling key input, a connecting portion having at least one of a plurality of interface pins and at least one of a plurality of power pins included in a connection part of said body for connecting said body to a power module;

said power module, which is attachable to said body, including a battery, a first connecting portion having at least one of said interface pins and at least one of said battery pins included in a connection part of said power module for connecting said power module to said body, and a second connecting portion having at least one of interface pints and at least one of said battery pins included in a connection part of said power module for connecting said power module to an external device; and said external device, which is attachable to said power module, including a connecting portion having at least one of said interface pins and at least one of said power pins included in a connection part of said external device for connecting said external device to said power module, wherein said body is capable of accessing said external device through said power module.

7. An information processing apparatus according to claim 6, said power module further comprising:
control means for controlling access from said body to a memory in said power module based on key information.

8. An information processing apparatus according to claim 6, said power module further comprising:
connection means for transmitting and receiving data by connecting to another device.

9. An information processing apparatus according to claim 6, wherein said information processor is a handy phone.

* * * * *